(No Model.)
T. PARISH.
MANUFACTURE OF GLASS.
No. 245,209. Patented Aug. 2, 1881.
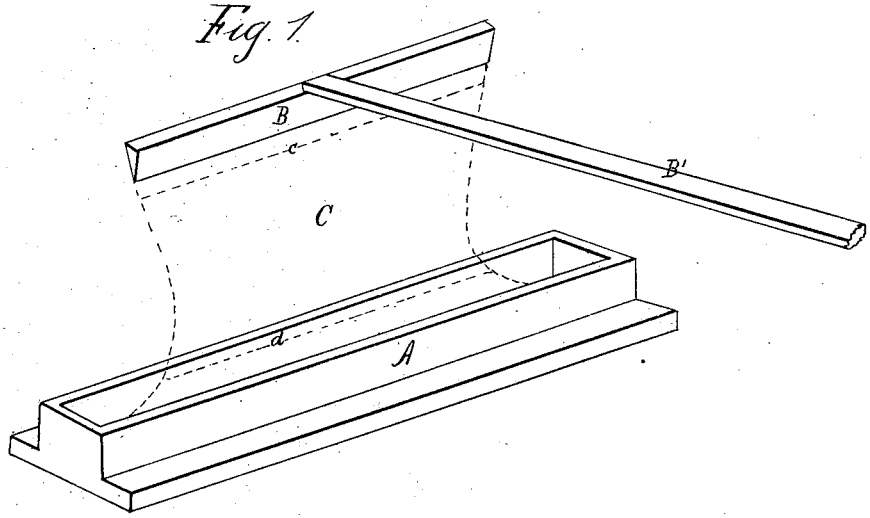
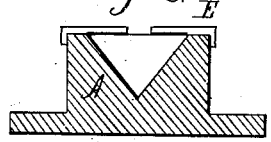
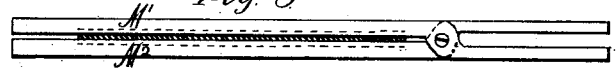
WITNESSES
Katie R. Ackell.
Charles C. Stetson.
INVENTOR
Thomas Parish
by his attorney

UNITED STATES PATENT OFFICE.

THOMAS PARISH, OF NEWARK, NEW JERSEY.

MANUFACTURE OF GLASS.

SPECIFICATION forming part of Letters Patent No. 245,209, dated August 2, 1881.

Application filed March 18, 1881. (No model.)

*To all whom it may concern:*

Be it known that I, THOMAS PARISH, a subject of the Queen of Great Britain, residing at Newark, in the county of Essex and State of New Jersey, have invented certain new and useful Improvements in the Manufacture of Glass, of which the following is a specification.

The invention relates to the production of plane sheets of any character or quality of glass for windows, picture-frames, mirrors, and analogous purposes.

The common method of blowing the glass in the form of a cylinder, and subsequently cutting open and flattening the extended sheet thus obtained, produces sheets which are waved. It is impracticable to reduce the cylindrical form to an absolutely plane one. It is certain to have slight undulations.

I have devised a method of manufacture which produces the sheets absolutely plane and with the two sides equally compacted and equally cooled. The operation may be conducted rapidly, and the surfaces naturally formed by the exposure of the melted material have a perfection of form which has heretofore been produced only by the expensive method of pressing the glass on a table by a roller and afterward grinding and polishing the surfaces.

I have discovered that a web or sheet of melted glass may be produced of substantially uniform thickness by causing the melted glass, at a proper temperature, to adhere to a horizontal bar and lifting the latter so slowly from the melted mass that the web or sheet of glass will sufficiently harden as it emerges to form a reliable support for the succeeding particles. The web narrows somewhat as the work proceeds. It is therefore important to start with a wider web than required for the finished rectangular sheet. I have devised means for conveniently cutting off the glass above and below the sheet required.

The following is a description of what I consider the best means of carrying out the invention.

The accompanying drawings form a part of this specification.

Figure 1 is a general perspective view. Fig. 2 is a cross-section through the trough. Fig. 3 represents a tool by which certain portions of the operation are effected.

Similar letters of reference indicate corresponding parts in all the figures.

A is a trough or vessel, of metal, clay, or other suitable material, in which the melted glass is poured or otherwise introduced, and lies in a semi-fluid condition.

B is a bar of metal capable of being steadily and slowly raised. I have shown a handle, B', to be operated by hand; but it will be understood that machinery may be used in working in a large way. The trough A and the bar B should both be at a temperature closely approximating that of the melted glass. On lowering the bar B so that its thin lower edge dips a little into the melted glass, and then slowly raising it, the glass is raised in a sheet, C, which is at first thick, but rapidly thins by the separation of its particles until the process is arrested by its cooling. If the bar is raised rapidly, the glass sheet is drawn out thin. If it is raised more slowly, the glass will be thicker. Under either condition the sheet or web of melted glass is absolutely plane and is exposed equally to the air on both faces. It hardens as fast as it is raised out of the melted mass, and the hardened portion above forms a support which draws up and sustains the soft web below. For a few inches above the level of the trough the glass remains sufficiently plastic to be impressed by any hard object. So soon as the bar B has been raised clear of the trough I subject the glass to pressure between two bars, M' M², hinged together at the point $m$ and operated by one or more attendants, so as to nip and produce a crease on each face of the glass opposite to each other. The inner edges of the bars M' M² being made of V section, the creases are of corresponding section. The first crease or groove is marked $c$. When the glass is sufficiently lifted the same tool or another is applied again near the trough to produce a second crease or groove, $d$. This last is done so near the melted surface of the glass and impressed so deeply as to cut the glass nearly off. After a little further lifting, allowing the creased portion to chill, a slight movement causes the glass to divide along that line, and the bar B', with the plate of glass C depending, may be moved away and placed in an annealing-kiln, or otherwise treated to attain the best condition of the finished article.

The sheet is separated from the bar B by breaking it along the line of the upper crease, c. The edges may be subsequently cut by a diamond.

I propose to make the operation continuous by resting the trough A on a furnace, or otherwise providing for maintaining its heat, and removing the chilled portions of the glass after each operation and introducing a fresh quantity at a proper temperature. I can provide a sufficient number of the troughs, previously warmed in an oven, and set each aside after it has been used until the small quantity of glass remaining after each operation is hard enough to be broken out. The form of the trough favors the removal in this manner. Or I can use a less number of the troughs, setting each back in the oven with its partially-chilled contents, and reduce the latter to a melted condition, and then add sufficient fresh stock and operate again.

I have in my experiments employed a partial cover for the trough A, which had the effect to cover all the glass in the trough, except a narrow line where the bar B enters and the sheet of glass rises. I have found this to work well, but believe it to be not essential to success. Such is represented at E in Fig. 2.

Modifications may be made in many of the details.

Instead of the simple hinged bars shown, arranged like a pair of shears, I can use simple levers with the pivot on the farther side of the glass from the workman; but in all forms of the device care must be taken, especially in producing the upper groove, c, that the edges do no not cross each other like shears, nor come actually together, but only approximate, so as to thin the glass without cutting it entirely off.

I can touch the glass with a cold iron along the creases c and d at the proper times to effect the fracture. I believe it practicable to imprint proper grooves for the upright divisions at each side, and thus to trim all the edges of the glass by the grooving and breaking.

I believe it to be especially important that the web of melted glass be raised very steadily. Practice may allow this to be done by hand with the highest perfection. If machinery is employed care should be taken to avoid jarring.

Instead of raising the bar B, I can lower the trough A, or I can effect the required gradual separation by dividing the motion between the two.

Instead of a separate tool having bars hinged together to effect the creasing of the glass along the lines where it is to be divided, I can attach suitable mechanism to the molds, or to a frame-work into which the molds shall be temporarily inserted, which shall, by the muscular strength of the operator or by power under his control, be brought nearly together and effect the creasing at the proper places.

The British patent to Clark, of 1857, No. 489, describes a mode of drawing up glass in plane sheets by means of a contact-piece of metal and rollers which act upon the faces; but I am not aware that any one, previous to my invention, has proposed to operate without touching the faces of the glass, or to crease while the glass is soft in lines where the glass is to be divided.

I claim as my invention—

1. The within-described process of producing plane sheets of glass by drawing up a bar, B, brought in contact with the glass at a high temperature, holding the glass untouched until after annealing, as herein specified.

2. The process described of producing plane glass by drawing up a web from a melted mass and creasing along lines where it is to be divided, and subsequently breaking along such lines, as herein specified.

3. In the manufacture of sheet-glass, the trough A, partial cover E, and bar B, combined and operated as herein specified.

In testimony whereof I have hereunto set my hand, at Morristown, New Jersey, this 7th day of March, 1881, in the presence of two subscribing witnesses.

THOMAS PARISH.

Witnesses:
 JOHN B. VREELAND,
 JAS. L. PRUDEN.